3,218,323
ESTERS OF 1,6-DIMETHYL-8-ERGOLENYL
CARBAMIC ACID
Albert Hofmann, Bottmingen, Paul Stadler, Biel-Benken, and Franz Troxler, Bottmingen, Basel-Land, Switzerland, assignors to Sandoz Ltd., Basel, Switzerland
No Drawing. Filed June 17, 1963, Ser. No. 288,450
Claims priority, application Switzerland,
June 18, 1962, 7,287/62
6 Claims. (Cl. 260—285.5)

The present invention relates to new ergolene and ergoline derivatives, their acid addition salts, and phamaceutical compositions containing as an essential active ingredient a said new ergolene or ergoline derivative or a non-toxic pharmaceutically acceptable acid addition salt in an inert carrier or vehicle prepared in unit dosage form.

The present invention provides compounds of the formula

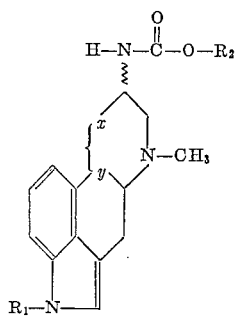

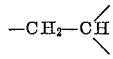

in which $R_1$ is an alkyl or an aralkyl, $R_2$ is an alkyl, halogeno alkyl, hydroxy alkyl, amino alkyl, aralkyl or cycloalkyl and $\widetilde{x\ y}$ is the radical —CH=C< or

—CH$_2$—CH< their acid addition salts and pharmaceutical compositions containing, in addition to an inert carrier or vehicle, a compound I and/or an acid addition salt thereof.

The compounds I and their acid addition salts are produced by converting a compound of the formula

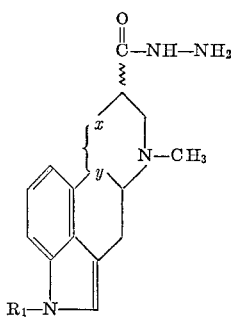

    II in which $R_1$ and $\widetilde{x\ y}$ have the above significance, via the azide to the corresponding isocyanate and reacting this with a compound of the formula $R_2$—OH            III in which $R_2$ has the above significance, or by reacting a compound of the formula

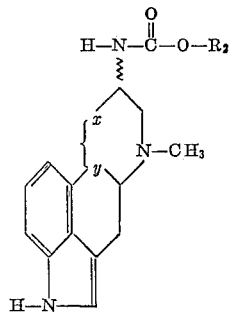

    IV in which $R_2$ and $\widetilde{x\ y}$ have the above significance, with a compound of the formula $R_1$—Halogen            V in which $R_1$ has the above significance, and, when an acid addition salt is required, salt formation is effected with an organic or inorganic acid in a manner per se known. Suitable acids for salt formation are, for example, hydrochloric, hydrobromic, hydriodic, sulfuric, citric, tartaric, succinic, maleic, malic, acetic, benzoic, fumaric, gallic, hexahydrobenzoic, methanesulfonic and phorphoric acids.

The following procedure may suitably be used for effecting the process of the invention:

A solution of a compound II in a dilute acid is cooled to 0° C., an aqueous sodium nitrite solution added and dilute acid added dropwise at a temperature of 0 to 5° C. After a few minutes it is covered with a layer of a solvent which is immiscible with water (e.g. benzene) and aqueous sodium bicarbonate solution is added until a weakly alkaline reaction is obtained.

The resulting solution of acid azide is dried over sodium sulphate, heated to the boil for a short time, a compound III added and heating to the boil continued for a short time in order to complete the formation of urethane. The crude product obtained on evaporating the solvent is purified by crystallization and/or chromatographic adsorption, using methods known per se.

In order to effect direct substitution of urethanes of Formula IV in the 1-position these compounds may be treated with an alkali metal alkanolate in liquid ammonia and the resulting alkali metal salt in liquid ammonia reacted with an organic halogen compound of Formula V. The ammonia is then evaporated, the residue taken up in a binary solvent, e.g., methylene chloride and water, and purified by crystallization and/or chromatographic adsorption using methods known per se.

The compounds of the invention are solid at room temperatures and crystallize well; with organic or inorganic acids they form salts which crystallize well and which, in general, are soluble in water. Examples of such organic or inorganic acids are hydrochloric, hydrobromic, sulphuric, citric, tartaric, succinic, maleic, malic, acetic, benzoic, hexahydrobenzoic, fumaric, methanesulphonic, gallic and hydriodic acid. The compounds I give a characteristic blue to violet blue colour with Keller's reagent (glacial acetic acid and concentrated sulphuric acid containing ferric chloride) and an intense blue colour with Van Urk's reagent (p-dimethylaminobenzaldehyde and dilute sulphuric acid) even with a very minute amount of a compound I (a few γ). The compounds of the present invention do not become converted to their isomeric form with dilute sodium hydroxide or phosphoric acid; in this respect they differ from other lysergic acid derivatives.

The compounds I are strong serotonin antagonists, so that they be used in the treatment of psychic and rheumatic illnesses as well as of allergies, inflammations and migraine.

The present invention also provides pharmaceutical compositions containing, in addition to an inert carrier, a compound I above or an acid addition salt thereof. An effective amount of a compound I is combined with an inert carrier or vehicle to provide a pharmaceutical composition in unit dosage form.

The term "known" as used herein designates a method described in the literature on the subject or in actual use.

In the following non-limitative examples, all temperatures are indicated in degrees centigrade. Melting points are uncorrected.

*Example 1.—N-(1,6-dimethyl-ergolenyl-8)-carbamic acid ethyl ester*

1.48 g. of 1-methyl-D-lysergic acid hydrazide are dissolved in 50 cc. of 0.1 N hydrochloric acid, the solution cooled to 0° and 5 cc. of N aqueous sodium nitrite solution added while stirring. After 3 minutes, 5 cc. of N hydrochloric acid are added dropwise at 0°, while stirring well, the aqueous solution is then covered with 200 cc. of benzene for 5 minutes and ice cold, saturated aqueous sodium bicarbonate solution added until the reaction mixture shows a weakly alkaline reaction. After separating, the aqueous phase is extracted twice, each time with 200 cc. of benzene, the united benzene solutions then washed until neutral with ice-cold, dilute aqueous sodium chloride solution, dried at high temperature over $Na_2SO_4$, heated rapidly to the boiling temperature and boiled under reflux for 5 minutes. 100 cc. of absolute alcohol are then added and the reaction mixture kept boiling for a further 5 minutes. The residue left on evaporating the volatile components is further purified by chromatography on 50 g. of aluminium oxide. The eluate of 70% methylene chloride and 30% benzene produces the desired urethane, which shows a melting point of 196–197° (decomp.) on recrystallizing from benzene. Colourless needles, Keller's colour reaction—violet blue $[\alpha]_D$ +42° (chloroform).

*Example 2.—N-(1,6-dimethyl-isoergolenyl-8)-carbamic acid-ethyl ester*

2.0 g. of 1-methyl-D-isolysergic acid hydrazide are converted into the urethane with 50 cc. of absolute ethanol as described in Example 1 and purified by chromatographing twice on 400 g. of aluminium oxide. The urethane is washed into the filtrate with a mixture of 75% methylene chloride and 25% benzene and purified by recrystallization from benzene: spherical crystals of M.P. 177–178° (decomp.) $[\alpha]_D$ +322° (in chloroform), Keller's colour reaction: violet blue.

*Example 3.—N-(1,6-dimethyl-isoergolenyl-8)-carbamic acid-cyclohexyl ester*

3.0 g. of 1-methyl-D-isolysergic acid hydrazide are converted into the urethane with 50 g. absolute cyclohexanol by the method described in Example 1. The period of reaction between the isocyanate and the cyclohexanol is prolonged to 2 hours at 80°, owing to the low rate of reaction of cyclohexanol. After evaporating the volatile components, the less volatile cyclohexanol is removed in a high vacuum and the residue chromatographed on 600 g. of aluminium oxide. The urethane is eluted with a 2:1 methylene chloride/benzene mixture and purified by recrystallization from ethanol: colourless rhombic plates of M.P. 137–138° $[\alpha]_D$ +267° (in chloroform), Keller's colour reaction: violet blue.

*Example 4.—N-(1,6 - dimethyl - ergolenyl - 8) - carbamic acid-benzyl ester*

2.5 of 1-methyl-D-lysergic acid hydrazide are converted into the urethane with 50 g. of abs. benzyl alcohol by the method described in Example 1. The period of reaction between the isocyanate and the benzyl alcohol is 90 minutes, the reaction temperature 80°. After evaporating the solvent, the excess benzyl alcohol is removed in a high vacuum and the residue recrystallized from alcohol: colourless needles, M.P. 165–166°, $[\alpha]_D$ +35° (in chloroform), Keller's colour reaction: violet blue.

*Example 5.—N-(1,6-dimethyl-isoergolenyl - 8) - carbamic acid-benzyl ester*

2.96 g. of 1-methyl-D-isolysergic acid hydrazide are converted into the urethane with 50 g. of absolute benzyl alcohol by the method described in Example 1. (The period of reaction between the isocyanate and the benzyl alcohol is 1 hour at 80°.) The excess benzyl alcohol remaining after removing the solvent is removed by heating in a high vacuum and the residue chromatographed on 500 g. of aluminium oxide. The urethane is eluted with a 3:1 methylene chloride/benzene mixture and purified by recrystallization from alcohol: needles of M.P. 153–154° $[\alpha]_D$ +266° (in chloroform), Keller's colour reaction: violet blue.

*Example 6.—N-(1,6-dimethyl-isoergolenyl-8) - carbamic acid-β-chloro-ethyl ester*

3.0 g. of 1-methyl-D-isolysergic acid hydrazide are converted into the urethane with 50 cc. of ethylene chlorohydrin, by the method described in Example 1. The period of reaction of the isocyanate with the ethylene chlorohydrin is 5 minutes at 80° The benzene solution, on cooling down to room temperature, is extracted several times with $NaHCO_3$ solution in order to remove the ethylene chlorohydrin and then extracted with water, dried over $Na_2SO_4$ and the benzene evaporated. The residue is chromatographed on 375 g. of aluminium oxide and the urethane eluted with methylene chloride is recrystallized from benzene: leaflets united in druses, M.P. 147–149°, $[\alpha]_D$ +252° (in chloroform), Keller's colour reaction: violet blue.

*Example 7.—N-(1,6-dimethyl-isoergolenyl-8)-carbamic acid-glycol ester*

2.96 g. of 1-methyl-D-isolysergic acid hydrazide are converted into the urethane with 100 cc. of absolute ethylene glycol, by the method described in Example 1 (reaction period of the isocyanate with the ethylene glycol is 1 hour at 80°). The benzene solution, on cooling, is shaken three times with water in order to remove the ethylene glycol and the solvent then distilled off under reduced pressure. The residue is chromatographed on 160 g. of aluminium oxide and the urethane washed from the column into the filtrate with methylene chloride which contains 0.2% of methanol and recrystallized from benzene and a little heptane: M.P. 150° $[\alpha]_D$ +260° (in chloroform), Keller's colour reaction: violet blue.

*Example 8.—N-(1,6-dimethyl-ergolenyl-8)-carbamic acid-N-diethylamino-ethyl ester*

2.0 g. of 1-methyl-D-lysergic acid hydrazide are converted into the urethane with 40 g. of diethylamino-ethanol in the manner described in Example 1 (reaction period is 5 minutes at 80°). After removing the volatile reaction components in a vacuum, the residue is chromatographed on 560 g. of aluminium oxide. The urethane is eluted with methylene chloride and recrystallized from benzene/heptane: M.P. 95.5–96.5° $[\alpha]_D$ +35° (in chloroform); Keller's colour reaction: violet blue.

*Example 9.—N-(1,6-dimethyl-isoergolenyl-8)-carbamic acid-N-diethylamino-ethyl ester*

2.0 g. of 1-methyl-D-isolysergic acid hydrazide are converted into the urethane with 45 g. of diethylamino-ethanol in the manner described in Example 1 (reaction time 5 minutes at 80°). After removing the benzene and the excess diethylamino-ethanol in a vacuum, the residue is chromatographed on 460 g. of aluminium oxide, the urethane eluted with methylene chloride and recrystallized from benzene/heptane: M.P. 116.5–117° $[\alpha]_D$ +255° (in chloroform), Keller's colour reaction: violet blue.

*Example 10.—N-(1-benzyl-6-methyl-ergolyl-8)-carbamic acid-n-propyl ester*

2.5 g. of 1-benzyl-9,10-dihydro-lysergic acid hydrazide are converted into the urethane with 50 cc. of absolute n-propanol in the manner described in Example 1 (reaction period of the isocyanate with the n-propanol is 5 minutes at 80°). The residue left after aspirating the volatile components is chromatographed on 100 g. of aluminium oxide, the urethane eluted with methylene chloride and recrystallized from methylene chloride/heptane: M.P. 186–187° $[\alpha]_D$ —68° (in chloroform), Keller's colour reaction: blue.

*Example 11.—N-(1,6-dimethyl-ergolyl-8)-carbamic acid-methyl ester*

1.195 g. of 1-methyl-9,10-dihydro-lysergic acid hydrazide are converted into the urethane with 100 cc. of absolute methanol in the manner described in Example 1 (reaction temperature 80°, reaction period of the methanol with the isocyanate is 5 minutes. After aspiration of the volatile components in a vacuum, the residue is chromatographed on 50 g. of aluminium oxide. The urethane is eluted with methylene chloride and recrystallized from benzene: M.P. 243–246° $[\alpha]_D$ —59.7°, Keller's colour reaction: cobalt blue, colourless needles.

*Example 12.—N-(1,6-dimethyl-isoergolenyl-8)-carbamic acid-ethyl ester*

3.1 g. of absolute tert. butanol in 15 cc. of abs. ether are added dropwise, while stirring, to a solution of 1.5 g. of potassium in 100 cc. of liquid ammonia, whereupon the blue colour of the solution disappears within a few minutes. 2.0 g. of finely powdered N-(6-methyl-iso-ergolenyl-8)-carbamic acid-ethyl ester are then added and stirring continued for 15 minutes at —45°, whereupon the urethane partially dissolves with a green, fluorescent colour. A solution of 5.5 g. of methyl iodide in 5 cc. of absolute ether is poured on to the mixture and the mixture reacted for 100 minutes at a temperature of —45 to —50°. For working up, the ammonia is aspirated in a vacuum, the residue taken up in methylene chloride and water and the solution chromatographed on 400 g. of aluminium oxide. The N-(1,6-dimethyl-iso-ergolenyl-8)-carbamic acid-ethyl ester is eluted with 2:1 methylene chloride/benzene and obtained in pure form by crystallization from benzene: spherical crystals of M.P. 177–178°. The mixture sample produced with N-(1,6-dimethyl-iso-ergolenyl-8)-carbamic acid-ethyl ester, prepared in accordance with Example 2, melts without depression. $[\alpha]_D$= +314° (in chloroform), IR- and UV-spectra are identical with the spectra of the comparison material.

*Example 13.—N - (1,6 - dimethyl-ergolenyl-8)-carbamic acid-propyl ester and N-(1,6-dimethyl-isoergolenyl-8)-carbamic acid-propyl ester*

4.48 g. of 1-methyl-D-lysergic acid hydrazide are converted into the azide as described in Example 1. The benzene solution of this is boiled for 5 minutes, 50 cc. of n-propanol added and then boiled for a further 5 minutes. The residue left after evaporating the volatile components is separated into the two isomers by chromatography on 40 parts of aluminium oxide.

*N-(1,6-dimethyl-isoergolenyl-8)-carbamic acid-propyl ester.*—The iso-form migrates more rapidly through the column and is washed into the filtrate with benzene.

M.P.=130–132°, on crystallizing from benzene/ether.
Keller's colour reaction: violet.
$[\alpha]_D^{20}$ +308° (in pyridine).

*N - (1,6 - dimethyl-ergolenyl-8)-carbamic acid-propyl ester.*—This compound is more strongly retained in the column and is washed into the filtrate with chloroform. M.P. 141–143° on crystallizing from benzene/petroleum ether.

Keller's colour reaction: dark blue.
Van Urk's colour reaction: violet.
$[\alpha]_D^{20}$ +43° (in pyridine).

*Example 14.—N - (1,6 - dimethyl-ergolenyl - 8)-carbamic acid-methyl ester and N-(1,6-dimethyl-isoergolenyl-8)-carbamic acid-methyl ester*

4.48 g. of 1-methyl-D-lysergic acid hydrazide are converted into the azide as described in Example 1, a benzene solution of the latter boiled for 5 minutes, 50 cc. of methanol are then added and boiling carried out for a further 5 minutes. The residue left after evaporating the volatile components is separated into the two isomers by chromatography on 100 parts of aluminium oxide.

*N-(1,6-dimethyl-isoergolenyl-8)-carbamic acid-methyl ester.*—The iso-form migrates more rapidly through the column and is washed into the filtrate with chloroform.

M.P. 159–11° on crystallization from benzene/ether.
Keller's colour reaction: dark blue.
Van Urk's colour reaction: violet.
$[\alpha]_D^{20}$ +325° (in pyridine).

*N - (1,6-dimethyl-ergolenyl-8)-carbamic acid-methyl ester.*—This compound adheres somewhat more strongly to the column and is washed into the filtrate with chloroform and 0.2% ethanol.

M.P. 191–193° on crystallization from chloroform/ether.
Keller's colour reaction: dark blue.
Van Urk's colour reaction: violet.
$[\alpha]_D^{20}$ +55° (in pyridine).

What is claimed is:
1. A compound selected from the group consisting of compounds of the formula

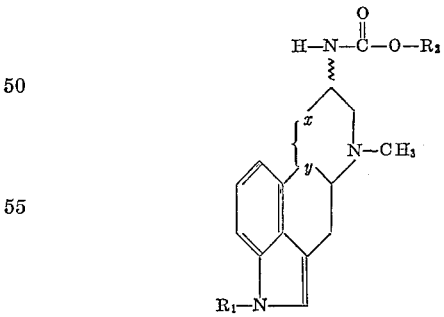

wherein $R_1$ is a member selected from the group consisting of methyl and benzyl, $R_2$ is a member selected from the group consisting of methyl, ethyl and propyl chloroethyl, hydroxyethyl diethylaminoethyl and cyclohexyl and $\widehat{x\,y}$ is one of the radicals

and

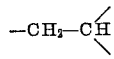

and their acid addition salts.

2. N-(1,6-dimethyl-ergolenyl-8)-carbamic acid ester of an alcohol, the alcohol being selected from the group consisting of ethyl alcohol, benzyl alcohol, diethylamino ethanol, propyl alcohol and methanol.

3. N-(1,6-dimethyl-isoergolenyl-8)-carbamic acid-ester of an alcohol, the alcohol being selected from the group consisting of ethanol, cyclohexanol, benzyl-alcohol, beta-chloroethylalcohol, diethylaminoethanol, propanol and methanol.

4. N-(1,6-dimethyl-isoergolenyl-8)-carbamic acid-ethylene-glycol ester.

5. N-(1-benzyl-6-methyl-ergolyl-8)-carbamic acid-n-propyl ester.

6. N-(1,6-dimethyl-ergolyl-8)-carbamic acid-methyl ester.

References Cited by the Examiner

UNITED STATES PATENTS 2,533,698   12/1950   Stoll _____ 260—285.5

FOREIGN PATENTS 811,964   4/1959   Great Britain.

OTHER REFERENCES

Burger: "Medicinal Chemistry," 1960, page 622 relied upon.

NICHOLAS S. RIZZO, *Primary Examiner.*

HENRY R. JILES, *Examiner.*